United States Patent [19]

Olshansky et al.

[11] Patent Number: 4,953,156
[45] Date of Patent: Aug. 28, 1990

[54] WIDEBAND SUBCARRIER MULTIPLEXED OPTICAL COMMUNICATION SYSTEM OPERATING OVER MORE THAN ONE OCTAVE

[75] Inventors: Robert Olshansky, Wayland; Paul M. Hill, Millis, both of Mass.

[73] Assignee: GTE Laboratories, Incorporated, Waltham, Mass.

[21] Appl. No.: 241,609

[22] Filed: Sep. 8, 1988

[51] Int. Cl.$^5$ .................. H04J 14/02; H04B 10/04
[52] U.S. Cl. .................................. 370/3; 455/610
[58] Field of Search ............. 370/3; 455/606, 607, 455/609, 610, 611, 612, 613, 617, 618

[56] References Cited

U.S. PATENT DOCUMENTS

| | | | |
|---|---|---|---|
| 4,468,766 | 8/1984 | Spezio | 370/3 |
| 4,701,904 | 10/1987 | Darcie | 370/3 |
| 4,726,011 | 2/1988 | Ih et al. | 370/3 |

OTHER PUBLICATIONS

Alferov, "Fiber Optical Long Distance Telecommunication Line Operating at the Wavelength of 13 $\mu$m", Sov. J. Quantum Electronics 8(11), 11–78, pp. 1403–1404.

"North America's First 13 $\mu$m Laser Transmission System", Integrated Optics Conference, 4-27-81, Cotten et al., pp. 20–22.

"Progress in Fiber Optics Transmission System for Cable TV", IEEE Transactions on Cable TV, vol. CATV-5, No. 2, 4–80, Deichmiller Communications Spectra, Deichmiller.

R. Olshansky et al., Electronics Letters, vol. 23, No. 22, pp. 1196–1198 (Oct. 22, 1987).

W. I. Way et al., J. Lightwave Technol., vol. LT-5, No. 9, Sep. 1987, pp. 1325–1332.

T. E. Darcie et al., Electronics Letters, vol. 22, No. 15, pp. 774–775 (Jul. 17, 1986).

R. B. Lauer, SPIE, vol. 756, Optical Technologies for Space Communication Systems, 1987, pp. 136–141.

R. Olshansky et al., IEEE Journal of Quantum Electronics, vol. QE-23, No. 9, Sep. 1, 1987, pp. 1410–1418.

J. Bowers, Electronics Letters, vol. 22, pp. 1119–1121, (1986).

Mendis et al., Electronics Letters, vol. 24, No. 7, pp. 442–443 (Mar. 31, 1988).

W. I. Way et al., Electronics Letters, vol. 24, No. 10, pp. 611–613, May 12, 1988.

*Primary Examiner*—Joseph A. Orsino
*Assistant Examiner*—L. Van Beek
*Attorney, Agent, or Firm*—Wolf, Greenfield & Sacks

[57] ABSTRACT

An optical communication system includes an optical transmitter for transmitting a subcarrier multiplexed optical signal through a single mode optical fiber to an optical receiver. The optical transmitter includes a semiconductor laser diode for generating a light beam. The laser diode is preferably a high speed InGaAsP laser diode emitting in a spectral range of 1.3–1.6 micrometers. The light beam is intensity modulated with a composite modulation signal to provide the optical signal for transmission. The composite modulation signal includes multiple modulated microwave carriers that cover a total bandwidth greater than one octave. Harmonics and intermodulation products do not interfere with transmission, and a favorable signal-to-noise ratio or bit error rate is maintained when the bandwidth of the composite modulation signal exceeds one octave.

8 Claims, 4 Drawing Sheets

WIDEBAND SUBCARRIER MULTIPLEXED OPTICAL COMMUNICATION SYSTEM OPERATING OVER MORE THAN ONE OCTAVE

FIELD OF THE INVENTION

This invention relates to optical communication systems wherein a light beam is intensity modulated by a plurality of microwave subcarriers and, more particularly, to optical communication systems wherein the total bandwidth of the microwave subcarriers that intensity modulate the light beam is more than one octave.

BACKGROUND OF THE INVENTION

Optical fiber transmission systems are being extensively used in the telephone network for long distance and interoffice trunk lines because of their wide bandwidth, small size and insensitivity to electrical interference. Conventional long distance optical transmission systems utilize time division multiplexed digital transmission. The maximum data rate available in commercial lightwave systems was for many years limited to 565 megabits per second, and has only recently been increased to 1.7 gigabits per second. A 565 megabits per second optical trunk line carrying 8,000 voice channels is very cost effective for voice transmission.

Recently, efforts have been made in the telecommunications industry to utilize optical transmission systems in the local, or subscriber, loop between the central office and individual subscribers. The goal is to provide not only voice, but also data and video transmission over the optical fiber to every home and business. The video services are expected to include not only broadcast services, but also switched video services which will enable each subscriber to select programming and movies from video libraries. An uncompressed digital video signal requires a data rate of about 100 megabits per second, and analog FM video requires a bandwidth of about 30 megahertz. As a result, the 565 megabit per second system, which is so effective for carrying voice channels, carries only a few video channels and must be supplemented with extensive video switching capability just to equal the channel selection presently available on cable TV. While optical fibers, laser diodes and photodiodes have more than adequate capability for bandwidths in excess of 565 megabits per second, the limiting factor is the unavailability of high speed digital electronics that are required for transmitters, for receivers and for multiplexing and demultiplexing circuits. To compete with conventional cable TV, which can provide 30 or more video channels, a subscriber distribution network based on conventional baseband digital fiber optic transmission must either operate at multigigabit per second data rates, or require extensive video switching capability.

To overcome these difficulties, microwave multiplexing of optical signals has been proposed. In these systems, a wideband microwave signal composed of many frequency multiplexed microwave carriers is used to intensity modulate a high speed laser diode. The optical signal is transmitted through a conventional single mode optical fiber to a remote location. The optical signal received at the remote location is detected with a high speed photodiode, and the transmitted signals are recovered with conventional microwave electronics. The microwave carriers can be modulated by either analog or digital signals and can be used to carry voice, data, video, digital audio, and high definition video, in almost any combination of services. Microwave modulated optical systems can be designed to transmit 4–8 gigahertz of bandwidth and can utilize the low-cost equipment presently utilized for satellite video transmission. Transmission of 60 frequency modulated video channels over 18 kilometers of optical fiber is described by R. Olshansky et al in "60-Channel FM Video Subcarrier Multiplexed Optical Communication System," *Electronics Letters*, Vol. 23, No. 22, pages 1196–1198 (Oct. 22, 1987). The transmission of ten FM video channels over 35 kilometers of optical fiber is described by W. I. Way et al in "A 1.3-$\mu$m 35-km Fiber Optic Microwave Multicarrier Transmission System For Satellite Earth Stations," *J. Lightwave Technol.*, Vol. LT-5, No. 9, September 1987, pages 1325–1332. The transmission of three 44 megabit per second signals over two kilometers of optical fiber is described by T. E. Darcie et al in "Lightwave System Using Microwave Subcarrier Multiplexing," *Electronics Letters*, Vol. 22, No. 15, pages 774–775 (July 17, 1986). An optical local area network utilizing microwave modulation of a light beam is disclosed in U.S. Pat. No. 4,701,904 issued Oct. 20, 1987 to Darcie.

In order to provide a wide range of subscriber services, it is desirable to optimize the information-carrying capability of the optical transmission system, while maintaining high quality video transmission and low error rate digital transmission. The information carrying capability can be increased by utilizing more microwave channels, and thereby utilizing a larger percentage of the available optical bandwidth. However, the semiconductor laser that converts the wide-bandwidth, multicarrier microwave signal to an intensity modulated optical signal is a nonlinear device which generates harmonics and intermodulation products. Harmonics and intermodulation products falling within one of the microwave signal channels reduce the signal-to-noise ratio of that channel. As the number of microwave channels is increased, the number of different harmonics and intermodulation products also increases. In the past, it was thought that second order harmonics at frequencies $2f_i$ and second order intermodulation products at frequencies $f_i \pm f_j$ would be so large that operation of a subcarrier multiplexed optical transmission system over a frequency band which exceeds one octave would be impossible. As used herein, the term "octave" refers to a frequency range wherein the ratio of the upper frequency limit to the lower frequency limit is 2 to 1.

It is a general object of the present invention to provide improved optical communication systems.

It is another object of the present invention to provide an optical communications system wherein a light beam is modulated by a plurality of microwave carriers having a total bandwidth greater than one octave.

It is a further object of the present invention to provide optical communication systems having a very large information-carrying capability.

It is still another object of the present invention to provide optical communication systems having the capability to carry voice, data and multiple video channels.

It is yet another object of the present invention to provide subcarrier multiplexed optical communication systems that utilize a major part of the available optical bandwidth.

SUMMARY OF THE INVENTION

According to the present invention, these and other objects and advantages are achieved in apparatus for transmitting an optical signal, comprising a semiconductor laser diode for generating a light beam and means for intensity modulating the light beam with a composite modulation signal to provide an optical signal for transmission. The composite modulation signal comprises a plurality of modulated microwave carriers that cover a total bandwidth greater than one octave.

The optical transmitting apparatus typically further includes means for generating a plurality of microwave carriers, means for frequency or phase modulating each of the carriers, and means for adding the frequency or phase modulated carriers to provide the composite modulation signal. Preferably, the means for intensity modulating the light beam includes means for applying the composite modulation signal to the laser diode. In a preferred embodiment, the laser diode is a high speed InGaAsP laser diode emitting in a spectral range of 1.3–1.6 micrometers, and the microwave carriers are in the range between about 2 and 20 gigahertz.

According to another aspect of the invention, there is provided an optical communication system including transmitter means as described above, receiver means remotely located from the transmitter means, including a detector responsive to the optical signal for providing the composite modulation signal and a receiver for separating and demodulating at least one of the microwave carriers from the composite modulation signal, and means for coupling the optical signal from the transmitter means to the receiver means. The optical signal is preferably coupled from the transmitter means to the receiver means through a single mode optical fiber.

According to still another aspect of the invention, there is provided a method for transmitting an optical signal comprising the steps of generating a light beam with a semiconductor laser diode, intensity modulating the light beam with a composite modulation signal to provide an optical signal for transmission, the composite modulation signal comprising a plurality of modulated microwave carriers that cover a total bandwidth greater than one octave, and transmitting the optical signal to a remote location.

By modulating the light beam with a plurality of microwave carriers that cover a total bandwidth greater than one octave, more of the available optical bandwidth is utilized, and a large number of wide-bandwidth channels can be simultaneously transmitted with an acceptable signal-to noise ratio. Harmonics and intermodulation products do not interfere with transmission, and a favorable signal-to-noise ratio or bit error rate is maintained when the bandwidth of the composite modulation signal exceeds one octave.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
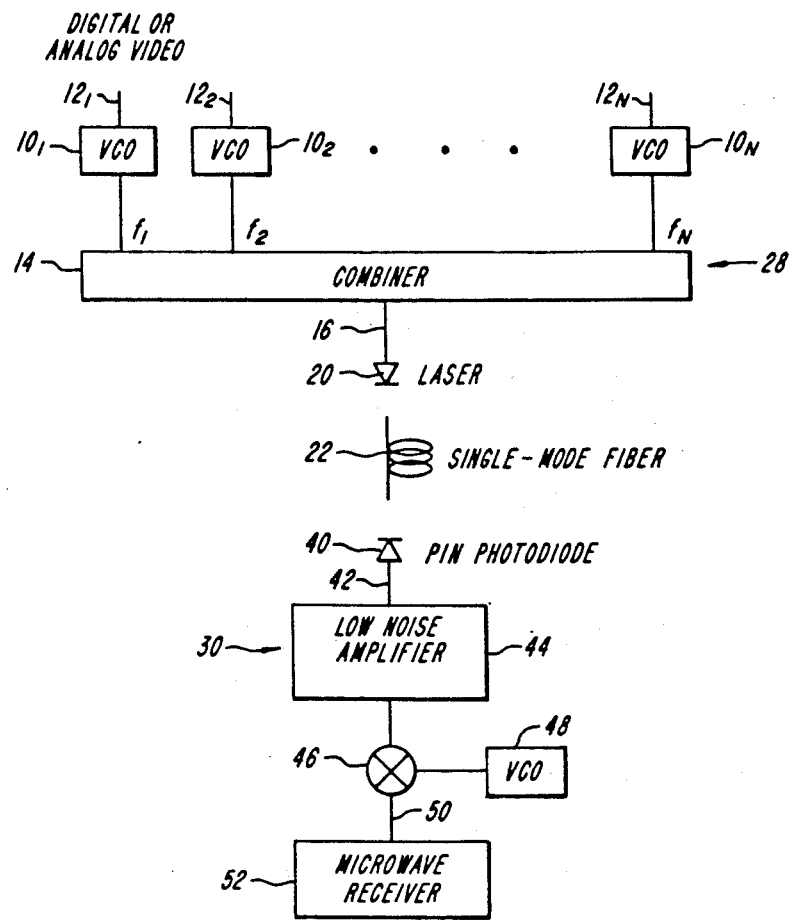
FIG. 1 is a block diagram of an optical communication system utilizing microwave subcarrier multiplexing.

A block diagram of a subcarrier multiplexed optical communication system suitable for implementation of the present invention is shown in FIG. 1. A plurality of voltage controlled oscillators, $10_1$, $10_2$–$10_N$, produce outputs in the microwave frequency range at frequencies $f_1$, $f_2$–$f_N$, respectively. Typically, the frequencies $f_1$, $f_2$–$f_N$ are in a frequency range between about 2 and 20 gigahertz. The spacing between adjacent frequencies is adequate to accommodate the expected signal bandwidths. The voltage controlled oscillators $10_1$, $10_2$–$10_N$ are modulated by signals on control lines $12_1$, $12_2$–$12_N$, respectively. The modulation signals, which can be digital or analog, produce frequency or phase variations in the outputs of the voltage controlled oscillators.

A microwave combiner 14 combines the microwave subcarriers at the outputs of voltage controlled oscillators $10_1$, $10_2$–$10_N$ to produce a composite microwave signal on an output line 16. The composite microwave signal on output line 16 is coupled to a laser diode 20 which functions as an optical transmitter. As described hereinafter, the laser diode 20 produces a light beam that is intensity modulated by the composite microwave signal from combiner 14 to provide a subcarrier multiplexed optical signal. The term "subcarrier multiplexed" refers to the fact that the primary carrier frequency is the optical signal at about $10^{14}$ Hz, while the microwave signals at $10^9$–$10^{10}$ Hz are the modulated subcarriers. The voltage controlled oscillators $10_1$, $10_2$–$10_N$, the combiner 14 and the laser diode 20 comprise a transmitter assembly 28.

The output of laser diode 20 is coupled to one end of a single mode optical fiber 22 which carries the intensity modulated optical signal to a receiver assembly 30. In a typical system, the transmitter assembly 28 and the receiver assembly 30 are remotely located from each other, and signals are coupled between them by the optical fiber 22. It will be understood that a typical subscriber loop may have many users coupled to an optical fiber. The optical fiber may include branches as necessary. Furthermore, each user is likely to have both a transmitter and a receiver. The system shown in FIG. 1 illustrates a single transmitter assembly and a single receiver assembly for ease of understanding.

The receiver assembly 30 includes a PIN photodiode 40 coupled to the other end of optical fiber 22 for receiving optical signals transmitted by laser diode 20. The photodiode 40 detects the intensity modulated optical signal and provides on an output line 42 the composite microwave signal containing the modulated microwave frequencies $f_1$, $f_2$-$f_N$. The detected signal from photodiode 40 is coupled to a low noise, wideband microwave amplifier 44. The output of amplifier 44 is coupled to one input of a mixer 46. A voltage controlled local oscillator 48 is coupled to the other input of mixer 46. The mixer 46 and local oscillator 48 convert a selected one of the microwave frequencies to a convenient intermediate frequency at an output 50 of mixer 46. The mixer output 50 is coupled to a microwave receiver 52 for demodulation of the intermediate frequency to provide the selected information signal.

Figure 2:
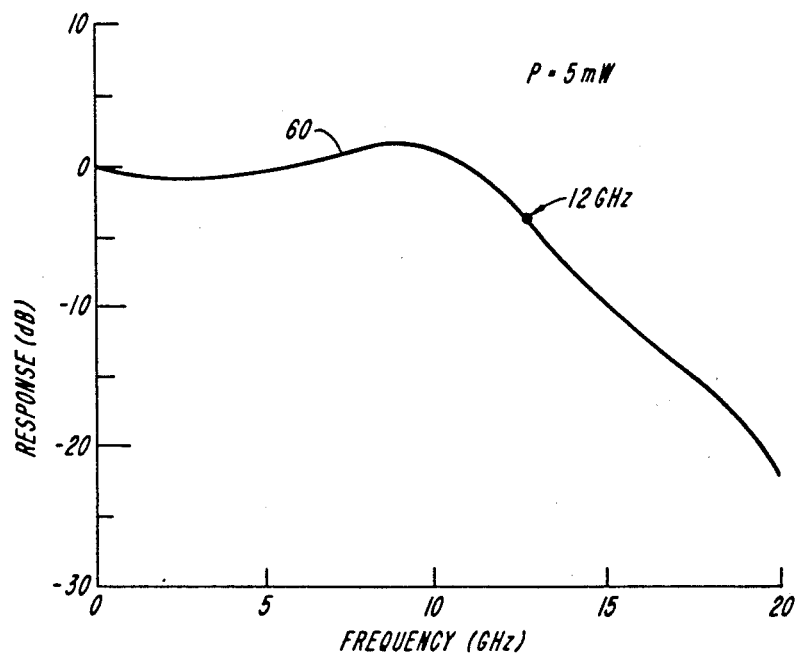
FIG. 2 is a graphic representation of the frequency response of a vapor phase regrown-buried heterostructure laser used in the optical communication system of FIG. 1.

It is apparent that the laser diode is a critical component of the transmitter assembly. In a preferred embodiment, the optical transmitter is a high frequency vapor phase regrown-buried heterostructure InGaAsP laser emitting in a spectral range of 1.3–1.6 micrometers. The laser has a very simple mesa geometry which reduces the parasitic capacitance due to PN junctions and results in extremely good, high speed performance. A sample of 25 devices with 200 micrometer cavity lengths had an average small signal modulation bandwidth of 11 gigahertz at a dc bias of 5 milliwatts. The frequency response of a typical device biased at 5 milliwatts is shown in FIG. 2 as curve 60. The fastest devices have small signal modulation bandwidths in excess of 20 gigahertz. Further information regarding the construction and characteristics of these diodes is provided in R. B. Lauer, "Optoelectronic Componentry for the Direct Transmission of Microwave Signals Over Optical Fiber," SPIE, Vol. 756, *Optical Technologies for Space Communication Systems*, 1987, pages 136–141 and R. Olshansky et al, "Frequency Response of 1.3 Micrometer InGaAsP High Speed Semiconductor Lasers," *IEEE Journal of Quantum Electronics*, Vol. QE-23, No. 9, September, 1987, pages 1410–1418.

The photodiode 40 is an InGaAs PIN structure wherein the mesa diameter is about 30 micrometers to reduce diode capacitance and the depletion width is about 1 micrometer to reduce transit time delays. These photodiode structures produce bandwidths in excess of 15 gigahertz. Further information regarding construction of such photodiodes is provided in the aforementioned Lauer article.

In the above-described configuration, intensity modulation of the light beam is accomplished by modulation of the laser diode that generates the light beam. In another approach, a light beam is generated by a laser diode, and the light beam is coupled to an optical modulator such as a lithium niobate crystal. In this approach, light generation and modulation are accomplished separately.

One advantage of the system shown in FIG. 1 is that it uses commercially available microwave equipment. The voltage controlled oscillators $10_1$, $10_2$-$10_N$ can, for example, be fast-tuned, narrow-band oscillators, and the combiner 14 can be a conventional $1 \times N$ power combiner. In the receiver assembly 30, the low noise amplifier 44 is typically a wideband amplifier with high gain and low noise, the mixer 46 is typically a double-balanced mixer, and the receiver 52 is typically a delay line discriminator or other type of demodulator. In one example, the amplifier 44 covered the 2–8 gigahertz band and had 40 dB gain with a 3 dB noise figure.

In the optical communication system of FIG. 1, the carrier frequencies $f_1$, $f_2$-$f_N$ are modulated with either an analog or a digital signal, $\Delta_i$. The intensity modulated signal, P(t), emitted by the laser diode 20 is given as $$P(t) = P_b[1 + \Sigma m_i \sin(2\pi f_i t + \Delta_i)] \quad (1)$$

where $m_i$ is the modulation index in channel i (i=1, 2,-N where N is the number of channels) and $P_b$ is the power in the unmodulated light beam. The modulation index $m_i$ is the ratio of the modulation power to the total power in the unmodulated light beam.

As noted above, the semiconductor laser diode that converts the composite modulation signal containing plural modulated microwave subcarriers to an intensity modulated optical signal is a nonlinear device which generates harmonics and intermodulation products. In the past, it was believed that intermodulation products would be sufficiently severe to make it impossible to transmit multichannel signals using semiconductor lasers. A detailed analysis of the effect of intermodulation products shows that this is not true.

When a microwave signal consisting of N modulated microwave carriers at frequencies $f_i$ is used to intensity modulate a semiconductor laser, $N^3$ third order intermodulation products are generated at frequencies $f_o \pm f_j \pm f_k$. Within each information channel, there are approximately $N^2/2$ intermodulation products which appear as incoherent noise sources. The optical power of each individual third order intermodulation product, $P_{IM3}$, relative to the optical power in the carrier, $P_c$, is given as $$P_{IM3}/P_c = m^2 IM_3 \quad (2)$$

where the third order intermodulation coefficient, $IM_3$, is less than 0.1. The resulting carrier-to-noise ratio of the detected electrical signal due to all $N^2/2$ third order intermodulation products, $CNR_3$, is given as $$CNR_3 = 2/[Nm^2 IM_3]^2 \quad (3)$$

The modulation index m in a single channel is on the order of 1/N or 2/N. Thus, the maximum $CNR_3$ is given as $$CNR_3 = [N/IM_3]^2/8 \geq 20 \log N + 11 dB \quad (4)$$

For a 10-channel system, $CNR_3$ is greater than 31 dB, and for a 100-channel system, $CNR_3$ is greater than 41 dB. For detection of a digital FSK signal, a CNR of only 16 dB is required for a $10^{-9}$ bit error rate, and even less CNR is needed for PSK or QPSK digital signals. For an analog FM modulated video signal with preemphasis noise reduction circuits, a 16.5 dB CNR is required for a studio quality, 56 dB weighted signal on the video baseband. Thus, noise generated by third order intermodulation products lies well below the noise level which will interfere with the transmission of high quality digital or analog signals.

In the past, it was assumed that second order harmonics at frequencies $2f_i$ and second order intermodulation products at frequencies $f_i \pm f_j$ would be so large that operation of a subcarrier multiplexed optical system over a frequency band which exceeds one octave would be impossible. An analysis of second order intermodulation products shows that this is not true.

The number of second order intermodulation products is greatest at the highest and lowest frequencies of operation. For a subcarrier multiplexed system which operates at carrier frequencies $f_i$ given by $$f_i = (N_0 - 1 + i)\Delta f \; i = 1, 2, -N \qquad (5)$$

where N is the number of channels, $N_0$ is determined by the lowest carrier frequency at $i=1$, and $\Delta f$ is the channel spacing. The number of second order intermodulation products depends on the channel number i. For second order intermodulation products of the form $f_i - f_j$, the number of intermodulation products is $(N - N_0 + 1 - i)$. For intermodulation products of the form $f_i + f_j$, the number of intermodulation products is $(i - N_0)/2$. The optical power of each individual second order intermodulation product, $P_{IM2}$, relative to the optical power in the carrier, $P_c$, is given as $$P_{IM2}/P_c = mIM_2 \qquad (6)$$

where $IM_2$ is the second order intermodulation coefficient. The coefficient $IM_2$ takes its maximum value at the laser's resonant frequency and has a value there on the order of unity. Thus, the worst case occurs when the highest carrier frequency occurs at the resonant frequency. The maximum carrier-to-noise due solely to second order intermodulation products, $CNR_2$, is given as $$CNR_2 = 2/[N - N_0)m^2 IM_2{}^2] \qquad (7)$$

When the modulation index m per channel is 1/N, then equation (7) becomes $$CNR_2 \geq 4N^2/(N - N_0) \qquad (8)$$

As an example, consider a 30-channel FSK transmission system carrying 100 megabits per second on each channel and having an interchannel spacing of 200 megahertz. A CNR of 16 dB is required to obtain a $10^{-9}$ bit error rate. Therefore, when $CNR_2$ is greater than 22 dB, the second order intermodulation products have negligible effect on system performance. Suppose $N_0$ is 10($f_1 = 2.0$ GHz) and N is 30($f_{30} = 7.8$ GHz). Then Eguation (7) indicates that this system can operate with a modulation index/channel as large as 0.022. This system would operate over a bandwidth of two full octaves. Even better carrier-to noise ratios could be obtained by using a laser with a resonant frequency greater than 7.8 GHz, or by using larger modulation indices at the higher subcarrier frequencies to overcome noise due to second order intermodulation products.

Figure 3:
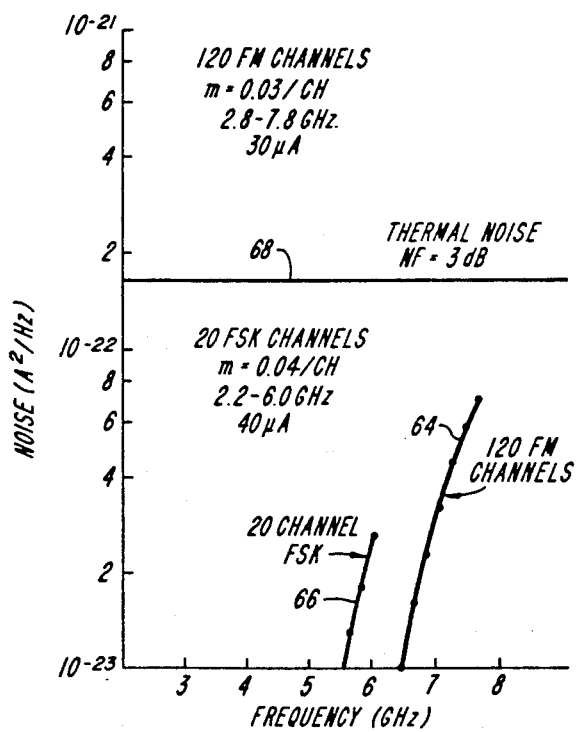
FIG. 3 is a graphic representation of noise power due to second order intermodulation products as a function of frequency for 120-channel FM and 20-channel FSK systems.

Noise power due to second order intermodulation products is plotted as a function of frequency in FIG. 3 for a 120-channel FM system and for a 20-channel FSK system. In the 120-channel system, a modulation index of 0.03 per channel was utilized for 120 FM channels in a frequency range of 2.8 to 7.6 gigahertz. The noise power for the 120-channel system is indicated in FIG. 3 by curve 64. In the 20-channel system, a modulation index of 0.04 per channel was utilized for 20 FSK channels in a frequency range of 2.2 to 6.0 gigahertz. The noise power for the 20-channel system is plotted in FIG. 3 as curve 66. For each system, the noise power is well below the amplifier thermal noise level, as indicated by line 68.

Figure 4:
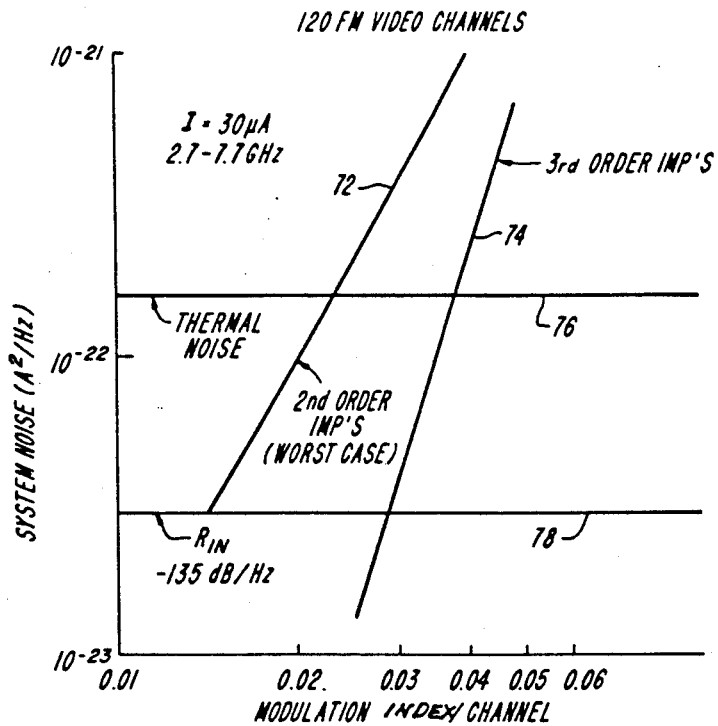
FIG. 4 is a graphic representation of noise power versus modulation index for a 120-channel FM system.

Noise power is plotted in FIG. 4 as a function of modulation index for a 120-channel FM system in the frequency range of 2.7 to 7.7 gigahertz. Curve 72 shows second order intermodulation products, and curve 74 shows third order intermodulation products. The amplifier thermal noise level is indicated by line 76, and the relative intensity noise of the laser is indicated by line 78.

A 20-channel FSK system was built to verify the analysis for subcarrier multiplexed digital video transmission. The 20 carriers spanned the 2 to 6 gigahertz band with a 200 megahertz spacing between carriers. The carrier frequencies were chosen as 2.1, 2.3, -5.9 gigahertz. This selection placed all the second order intermodulation products at frequencies, $f_i \pm f_j$, which lie between the carriers. The frequency deviation of each carrier was 100 megahertz.

Each subcarrier was generated by a voltage controlled oscillator (VCO) and was multiplexed using microwave power combiners as shown in FIG. 1. Each VCO was followed by an isolator (not shown) to prevent distortion which could be caused by interaction between VCO's and by electrical reflections. Filters were used where appropriate to eliminate second harmonics generated by the VCO's which fall within the 2 to 6 gigahertz band. The optical link consisted of a 1.3 micrometer InGaAsP vapor phase regrown-buried heterostructure laser, 12 kilometers of standard single mode optical fiber and an InGaAs PIN photodetector. The laser, which was biased at 5 milliwatts per facet, had a resonant frequency of 9 gigahertz and had a flat frequency response and a relative intensity noise of less than $-135$ dB/Hz over the 2 to 6 gigahertz band. The noise contributed by the largest second order intermodulation distortion was measured to be at least 10 dB below the thermal noise of the microwave amplifier for modulation indices of 5.5 percent per channel or less.

Figure 5:
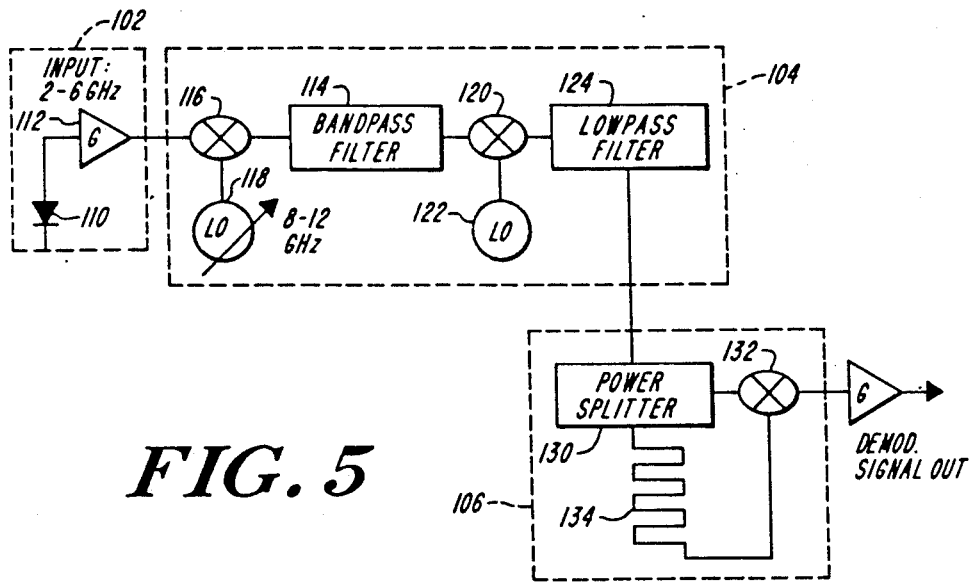
FIG. 5 is a block diagram of a receiver for a 20-channel FSK video system.

The receiver for the 20-channel FSK system is shown in FIG. 5. The receiver includes an optical input section 102, a channel selection and frequency conversion circuit 104 and a discriminator 106. The optical input section 102 includes a photodiode 110 for receiving the optical signal from the optical fiber. The microwave signal from photodiode 110 is coupled through a low noise microwave amplifier 112 having a passband from 2 to 6 gigahertz to the channel selection and frequency conversion circuit 104. Frequency selection is accomplished with a bandpass filter 114 centered at 6.5 gigahertz, a mixer 116 and a tunable VCO 118 operating over 8 to 13 gigahertz. The output of amplifier 112 and the output of VCO 118 are coupled to the inputs of mixer 116. The output of mixer 116 at 6.5 gigahertz is coupled to one input of a mixer 120. A local oscillator 122 at 7.7 gigahertz is coupled to the other input of mixer 120 so as to downconvert the signal to a 1.2 gigahertz intermediate frequency which passes through a lowpass filter 124 to discriminator 106.

In discriminator 106 a power splitter 130 divides the input power to one input of a mixer 132 and a delay line 134 having a typical delay of 2.5 nanoseconds. The output of delay line 134 is coupled to the other input of mixer 132. The output of mixer 132 is the demodulated output signal.

Figure 6:
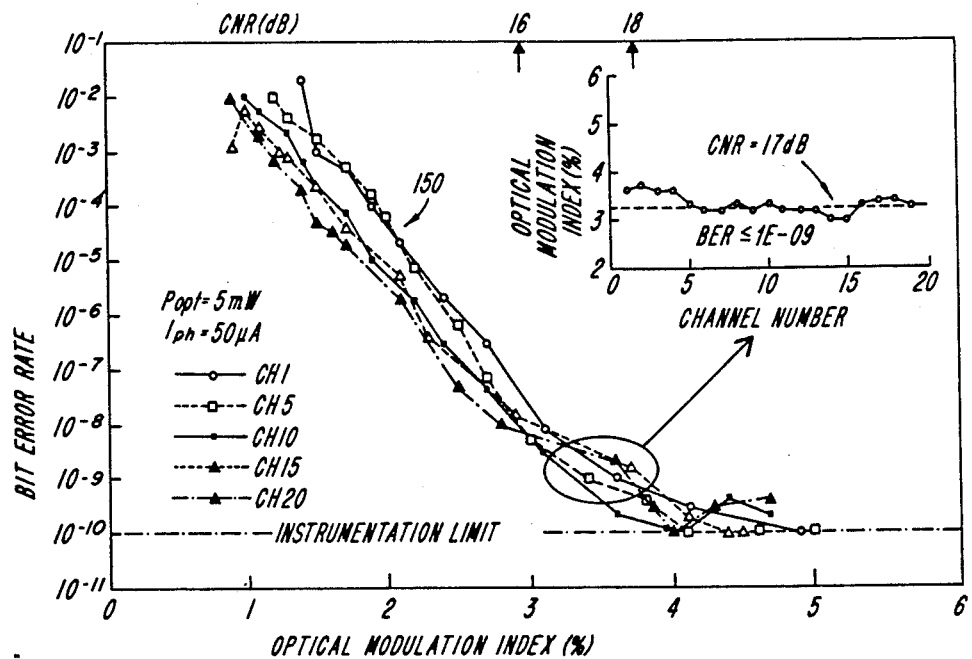
FIG. 6 is a graphic representation of measured bit error rate as a function of modulation index per channel for the 20-channel FSK video system.

The measured bit error rates of 5 channels of the 20-channel system as a function of the modulation index per channel are shown in FIG. 6 as curves 150. The results were obtained with a dc photocurrent of 50 microamps. A modulation depth of 3.3±0.3 percent per channel was required to obtain a $10^{-9}$ bit error rate. The corresponding CNR of 17 dB was within 1 dB of the theoretical value. The system was successfully operated with modulation indices of up to 5 percent per channel.

Figure 7:
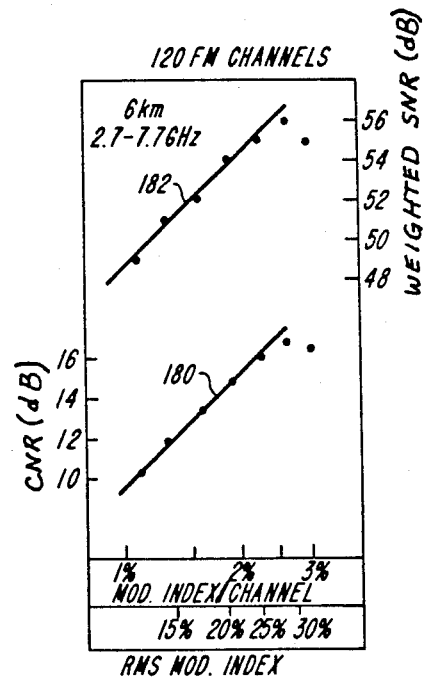
FIG. 7 is a graphic representation of carrier-to-noise ratio (CNR) and signal-to-noise ratio (SNR) as a function of modulation index for the 120-channel transmission system.

Measured values of CNR and SNR for a 120-channel FM subcarrier multiplexed optical signal transmitted over 6 kilometers of optical fiber are shown in FIG. 7 as curves 180 and 182, respectively. A modulation index of 0.028 was required to achieve a 16 dB CNR and a 56 dB SNR. The decrease of SNR at higher modulation indices is not caused by second order intermodulation products, since it is essentially independent of channel number.

It will be understood that the optical transmission technique, wherein the total bandwidth of the modulation signal exceeds one octave, is not limited to the system configuration disclosed herein. The optical transmission technique of the invention can be applied to any subcarrier multiplexed optical system, including broadcast systems, controlled switching systems and the like. While the technique is most useful for transmission of wideband video signals, any other signals can be transmitted, and the subcarrier modulation can be either digital or analog. Furthermore, while the optical signal is most advantageously carried on an optical fiber, it can also be transmitted through space or through any suitable optical transmission medium.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for transmitting an optical signal, comprising:
    a semiconductor laser diode for generating a light beam;
    means for generating and modulating a plurality of microwave carriers;
    means for combining said microwave carriers to provide a composite modulation signal in a frequency range between about 2 and 20 gigahertz, said composite modulation signal having a total bandwidth greater than one octave; and
    means for coupling said composite modulation signal to said laser diode for modulation of said light beam to provide an optical signal for transmission.

2. Optical transmitting apparatus as defined in claim 1 wherein said laser diode comprises a high speed InGaAsP laser emitting in a spectral range of 1.3–1.6 micrometers.

3. Optical communication apparatus comprising:
    transmitter means including means for generating a light beam and means for intensity modulating the light beam with a composite modulation signal in a frequency range between about 2 and 20 gigahertz to provide an optical signal, said composite modulation signal comprising a plurality of modulated microwave carriers that cover a total bandwidth greater than one octave;
    receiver means remotely located from said transmitter means, including a photodetector responsive to said optical signal for providing a received signal having a carrier-to-noise ratio greater than about 16 dB and a receiver for separating and demodulating at least one of said microwave carriers from said received signal; and
    means for coupling said optical signal from said transmitter means to said receiver means.

4. Optical communication apparatus as defined in claim 3 wherein said coupling means comprises a single mode optical fiber.

5. A method for transmitting an optical signal comprising the steps of:
    generating a light beam with a semiconductor laser diode;
    intensity modulating the light beam with a composite modulation signal to provide an optical signal for transmission, said composite modulation signal comprising a plurality of modulation microwave carriers in a frequency range between about 2 and 20 gigahertz and having a total bandwidth greater than one octave; and
    transmitting the optical signal to a remote location.

6. A method for transmitting an optical signal as defined in claim 5 wherein the step of transmitting the optical signal includes transmitting the optical signal on an optical fiber.

7. A method for transmitting an optical signal as defined in claim 5 further including the steps of
    generating said modulated microwave carriers, and adding said modulated carries to provide said composite modulation signal.

8. A method for transmitting an optical signal as defined in claim 5 wherein the step of generating a light beam includes generating a light beam with a high speed InGaAsP laser.

* * * * *